United States Patent [19]

Watanabe et al.

[11] 3,709,723
[45] Jan. 9, 1973

[54] INORGANIC REFRACTORY LIQUID COMPOSITION

[75] Inventors: Ryuji Watanabe, Yokohama; Masayuki Watanabe, Tokyo, both of Japan

[73] Assignee: Tokyo Shibaura Electric Co., Ltd., Kawasaki-ski, Japan

[22] Filed: Sept. 29, 1970

[21] Appl. No.: 76,629

[30] Foreign Application Priority Data

Oct. 1, 1969 Japan ..............................44/77797
Dec. 26, 1969 Japan ............................44/104365
Dec. 26, 1969 Japan ............................44/104367

[52] U.S. Cl..................117/124 A, 106/57, 106/65, 106/85, 117/124 B, 117/124 C, 117/126 R, 117/127, 117/135, 117/138, 117/160 R, 117/169 R, 117/DIG. 10, 148/6.15 R
[51] Int. Cl.............................C03c 17/22, C23f 7/00
[58] Field of Search ......117/127, 138, 169 R, 126 R, 117/124 A, 124 C, 135.1, 160 R, 124 B, DIG. 10; 148/6.15 R; 106/57, 65, 85

[56] References Cited

UNITED STATES PATENTS 2,476,345  7/1949  Zararella ..........................148/6.15 R

*Primary Examiner*—Alfred L. Leavitt
*Assistant Examiner*—Janyce A. Bell
*Attorney*—Kemon, Palmer & Estabrook

[57] ABSTRACT

The present invention provides a process for preparing (i) inorganic refractory liquid compositions comprising a metal nitride and phosphoric acid or ammonium salts of phosphoric acid as main constituents, and (ii) a method of forming a phosphate of said metal by the reaction of said compositions at temperatures below 150°C after applying said inorganic compositions to a prescribed material.

10 Claims, No Drawings

INORGANIC REFRACTORY LIQUID COMPOSITION

The present invention relates to organic refractory liquid compositions and a process for forming refractory material obtained by hardening said composition.

As conventional refractory paints, there are paints made refractory by adding inorganic salts to organic resins such as alkyd resin or silicone resin. These paints are not entirely of inorganic matter; therefore, such paints are simply flame-retarding. When such paints are heated at a temperature above 300° to 400°C, they exhibit deterioration of the property as a result of softening or cracking. If such paints are exposed to flame, they burn with black fume, liberating poisonous gas.

As compositions having better resistance against fire, there are known inorganic refractories such as aluminum phosphate, boron phosphate, etc. Aluminum phosphate, in particular, resists elevated temperatures higher than 1,500°C and also has adequate physical strength. It will be apparent that such refractories may be used widely if such inorganic refractories can be prepared as liquid compositions, applied to the surface of a base material, and then hardened by heating at temperatures below about 150°C to form an inorganic refractory coating which is perfectly incombustible, fire resistant, and physically strong. It has been difficult, however, to form above-mentioned refractory coating layer on the base material inferior in fire resistance, because such inorganic refractories have been obtained as a compound burned in advance and thereafter formed in a desired shape for sintering at high temperatures above 1,000°C.

The present invention, in view of the aforementioned fact, has for its object to provide inorganic refractories in the form of liquid composition and a process for imparting fire resistance on various base materials by applying said liquid compositions to the surfaces of the various base materials and by subsequently hardening said applied liquid compositions. Another object of this invention is to provide said liquid compositions as refractory adhesives.

The inorganic refractory liquid compositions relating to this invention are characterized by containing as main constituents (1) a metal nitride selected from the group consisting of aluminum nitride, boron nitride, titanium nitride, iron nitride, thallium nitride, and zirconium nitride, and (2) one selected from phosphoric acid and ammonium phosphates, applying said liquid compositions to the surface of a base material, thereafter reacting it to harden at a temperature in the range from room temperature to 150°C so as to obtain an inorganic refractory coating.

Among the metal nitrides, used for the liquid composition according to the present invention, aluminum nitride, titanium nitride, iron nitride and thallium nitride are relatively active in their reactions to phosphoric acid, whereby swiftly forming a high binding hardened material. A metal nitride, generally, has a tendency to harden in its reaction to phosphoric acid, but metal nitrides of active metals belonging to groups I and II of the elemental periodic table, such as magnesium nitride, or chemically instable metal nitrides such as molybdenum nitride, tungsten nitride are too reactive against phosphoric acid to employ in the present invention. As ammonium salts of phosphoric acid may be used as desired monoammonium phosphate, diammonium phosphate, and triammonium phosphate. The advantage of using these ammonium salts of phosphoric acid, first, lies in that compositions containing these metal nitrides and an ammonium phosphate as main constituents are chemically neutral and can be applied to base materials susceptible to acidic matters such as aluminum and magnesium, and secondly, in that a large amount of ammonia is liberated in the reaction of ammonium phosphate with these metal nitrides and the coating becomes porous, light in weight, relatively high in physical strength, and low in heat conductivity, thus having application in heat insulating material. If a foaming agent such as aluminum powder is mixed in the composition, the better foamed body will be obtained.

Further, ferric oxide, voltile fluid such as water, alcohol, etc., and heat resistant inorganic substances such as silica, alumina, etc. may be added to the composition besides the aforementioned main constituents. Ferric oxide, when the refractory liquid composition is applied to electronic parts such as a resistor element, acts to suppress the reaction of said liquid composition with the resisting material forming the base. In case, for instance, a paint consisting of aluminum nitride and phosphate but not containing ferric oxide is applied to a resistor element of tin oxide, the resistance value becomes about 10 times greater; however, in case a paint containing ferric oxide is applied, the value of resistance hardly varies. The addition of refractory inorganic material such as alumina, etc. is useful for improving heat resistance and physical strength, and also facilitates the control of rate of hardening and the temperature at which hardening starts. The addition of volatile fluid such as water, alcohol, etc. helps to adjust the viscosity of the liquid composition.

The mixing ratio of a metal nitride such as aluminum nitride, boron nitride, etc. and phosphoric acid or ammonium phosphate is not specified in particular; however, it is not desirable to contain phosphoric acid or ammonium phosphate in excess of stoichiometric quantity for the reaction to form a metal phosphate, because the excess of such components deteriorates the water-resistant property of the coating. If the quantity of phosphoric acid is extremely smaller than the stoichiometric quantity, it is necessary to control the viscosity of the composition by mixing solvents such as water, alcohol, etc.

In the invention of the present application, liquid compositions start hardening in the temperature ranging from room temperature to 150°C. The temperatures above 150°C should be avoided, because the reaction suddenly takes place at such temperatures, making the formed coating porous or causing other defects.

EXAMPLE 1

Nineteen weight percent aluminum nitride was added to 43 weight percent phosphoric acid (85 percent in concentration) and 38 weight percent silica, and then the mixture was sufficiently stirred. The mixture is a viscous fluid and has best extensibility and adhesiveness for using as paints and adhesives. This mixture was coated on plates of metal, glass, asbestos and then dried at about 50°C for 10 minutes to form a thin rigid coating containing aluminum phosphate as a main constituent. This coating was heated above 1,000°C with an oxyhydrogen burner, but it neither burned nor cracked. The adhesive strength between the base material and the coated film was so great that even a sharp-edged tool could not scrape off the coating.

EXAMPLE 2

Twelve weight percent ethyl alcohol was added to the mixture of 22 weight percent aluminum nitride, 33 weight percent phosphoric acid, and 33 weight percent silica, and a resultant viscous fluid was coated on the same base material as in Example 1. After drying at 100°C for 10 minutes, there was obtained a thin rigid coating containing aluminum phosphate as a main constituent and having excellent heat resistance and adhesiveness as was the case with Example 1.

In case alcohol was not added, the mixture hardened when left along at room temperature for 24 hours. In case that alcohol was added and then left alone for many hours, the mixture did not harden and maintained an unreacted condition until alcohol had completely vaporized. This characteristic of a mixture is of great advantage in the case of preservation.

Needless to say, alcohol completely vaporizes upon hardening and does not affect incombustibility adversely.

EXAMPLE 3

Immediately after mixing 40 weight percent aluminum nitride with 60 weight percent phosphoric acid, the mixture was a viscous fluid but it became aluminum phosphate after 2 to 3 minutes as a result of hardening reaction. This composition is poor in strength and waterproofness compared with the compositions of Examples 1 and 2 which were heated at temperatures above 50°C after adding silica, etc. to the mixture. However, this composition is very useful if the material to be coated or adhered should not be subjected to temperatures above room temperature.

EXAMPLE 4

Twenty weight percent boron nitride and 80 weight percent phosphoric acid were mixed to form a mixture and the resultant mixture was coated as in the aforementioned Examples. The reaction readily took place when dried at 150°C and for about 15 minutes, and a coating of boron phosphate was formed. Although the reaction is completed in said treatment, it is recommended to heat-treat the coating at a temperature above 400°C for more than one hour, because the strength, waterproofness, and adhesiveness of the coating are remarkably improved by the heat treatment.

EXAMPLE 5

Two parts of aluminum nitride, 20 parts of aqueous solution of diammonium phosphate $(NH_4)_2HPO_4(H_2O : (NH_4)_2 = 1 : 2)$, and 4 parts of silica as a filler were mixed and stirred to a viscous muddy mixture and the pH valve of said mixture was 7. When the mixture was coated on an aluminum plate and then heated at 70°C for 30 minutes for hardening, the coating adhered firmly to the aluminum plate in a solid state. The coating did not crack, scale off, or cause other defects even when it was heated at about 400°C for 3 hours; the adhesive strength remarkably increased and the coating was not scraped off by a knife.

EXAMPLE 6

Twenty parts of a mixture having pH value of and consisting of 2 parts of aluminum nitride, aqueous solution of monoammonium phosphate $(NH_4)H_2PO_4(H_2O : (NH_4)H_2POC4=2)$, and 3 parts of potassium hydroxide KOH was mixed with 2 parts of silica and one part of iron oxide as a pigment, and the resultant mixture was stirred. The mixture was a viscous fluid as the one obtained in Example 1 and has good extensibility and adhesiveness suitable to paints and adhesives. When this mixture was coated on aluminum and asbestos plates and dried for hardening at normal temperature, a rigid coating colored in red was obtained.

This coating showed excellent heat resistance and adhesiveness as the coating of Example 1.

EXAMPLE 7

Two parts of aluminum nitride, 60 parts of aqueous solution of triammonium phosphate $(NH_4)_3PO_3 \cdot 3H_2O(HO:(NH_4)_3PO_4 3H_2 3H_2=O=1:5)$, and 20 parts of silica were mixed to form a fluid, and then filled into a cubic mold. After heating for solidification at 100°C for 1 hour, a foamed cubic substance light in weight having density about 2g/cm³ was obtained. The cubic product retained its rigidity without deformation even when heated to high temperatures above 1,000°C with an oxyhydrogen burner.

EXAMPLE 8

Two parts of aluminum nitride, 4 parts of phosphoric acid, 2 parts of silica, and 1 part of ferric oxide $Fe_2O_3$ were mixed and stirred to form a paint. This paint was a viscous fluid and had extensibility and adhesiveness suitable to a paint. This paint was coated on a resistor body of tin oxide film and then hardened by drying at 70°C for about 3 hours. The dried coating was very rigid, smooth, and lustrous. When the resisting body coated with this paint was heated at 1,000°C for 1 hour and then cooled to room temperature, the coating was incombustible and neither liberates poisonous gas nor causes crack. Furthermore, the resistance value of this resisting body coated with this paint remained nearly unchanged; the resistor body of about 300 KΩ changed the resistance only within ±1.5 percent, the one of about 10 KΩ only within ±1.0 percent.

In case $Fe_2O_3$ alone was eliminated from the above composition, the resistance value of the resistor body increased to 4 to 5 times the resistance value prior to the coating.

EXAMPLE 9

Two parts of aluminum nitride, 4.5 parts of phosphoric acid, 2 parts of $Al_2O_3$, one part of $Fe_2O_3$, and one part of water were mixed to make a paint. This paint had a fluidity suitable to a paint as the one in Example 1. This paint was coated on a resistor body of tin oxide film and dried at 70°C for about 10 hours. The heat resistance and physical strength of this coating were equally excellent to those of the one obtained in Example 1. However, the time required to harden the